US011757669B1

(12) United States Patent
Wang et al.

(10) Patent No.: US 11,757,669 B1
(45) Date of Patent: Sep. 12, 2023

(54) ASYNCHRONOUS DYNAMIC GENERATION OF MEETING AGENDAS BASED ON CONTENT DISCUSSIONS AND EXPERT ASSESSMENT

(71) Applicant: Daommo, Inc., Foster City, CA (US)

(72) Inventors: Chuhan Wang, Foster City, CA (US); Wentao Zheng, Mountain View, CA (US); Phil Libin, San Francisco, CA (US)

(73) Assignee: Daommo, Inc., Foster City, CA (US)

( * ) Notice: Subject to any disclaimer, the term of this patent is extended or adjusted under 35 U.S.C. 154(b) by 0 days.

(21) Appl. No.: 17/696,932

(22) Filed: Mar. 17, 2022

Related U.S. Application Data

(60) Provisional application No. 63/165,937, filed on Mar. 25, 2021.

(51) Int. Cl.
H04L 12/18 (2006.01)

(52) U.S. Cl.
CPC ...... H04L 12/1831 (2013.01); H04L 12/1818 (2013.01); H04L 12/1822 (2013.01)

(58) Field of Classification Search
CPC ............. H04L 12/1831; H04L 12/1818; H04L 12/1822
See application file for complete search history.

(56) References Cited

U.S. PATENT DOCUMENTS

| | | | | |
|---|---|---|---|---|
| 2006/0224430 A1* | 10/2006 | Butt | ............... | G06Q 10/063116 705/7.19 |
| 2008/0022209 A1* | 1/2008 | Lyle | ..................... | G06Q 10/109 715/730 |
| 2009/0006161 A1* | 1/2009 | Chen | .................. | G06Q 10/1095 705/7.19 |
| 2011/0231409 A1* | 9/2011 | Dhara | ..................... | H04L 47/70 707/748 |
| 2011/0231773 A1* | 9/2011 | Dhara | ................... | H04L 65/403 707/769 |
| 2013/0254279 A1* | 9/2013 | Bentley | ............... | G06F 16/9535 709/204 |
| 2016/0005005 A1* | 1/2016 | Dhara | ................... | H04L 65/403 705/7.19 |
| 2018/0039951 A1* | 2/2018 | Wynn | ................ | G06Q 10/1095 |

(Continued)

Primary Examiner — Patrice L Winder
(74) Attorney, Agent, or Firm — Muirhead and Saturnelli, LLC

(57) ABSTRACT

Generating an agenda for a meeting includes creating a content repository that includes content corresponding to feedback from previous targeted meetings and/or information corresponding to ongoing discussions between potential attendees of the meeting, automatically creating a prioritized list of discussion topics, and at least one expert providing gestures to a computer screen to create an assessment for the discussion topics, display additional data for the prioritized list of the discussion topics, and/or transfer one or more of the discussion topics of the prioritized list of the discussion topics to either a list of dropped discussion topics or to an ordered list of selected discussion topics. An agenda is automatically generated based on the ordered list of selected discussion topics and on weights assigned to the at least one expert according to relative expertise. An order of agenda items is based in part on the weights.

20 Claims, 9 Drawing Sheets

(56) References Cited

U.S. PATENT DOCUMENTS

| | | | |
|---|---|---|---|
| 2018/0152539 A1* | 5/2018 | Bastide | H04L 12/1822 |
| 2021/0150398 A1* | 5/2021 | Bastide | G06N 20/00 |
| 2022/0103566 A1* | 3/2022 | Faulkner | H04L 67/535 |

* cited by examiner

ASYNCHRONOUS DYNAMIC GENERATION OF MEETING AGENDAS BASED ON CONTENT DISCUSSIONS AND EXPERT ASSESSMENT

CROSS-REFERENCE TO RELATED APPLICATIONS

This application claims priority to U.S. Prov. App. No. 63/165,937, filed on Mar. 25, 2021, and entitled "ASYNCHRONOUS DYNAMIC GENERATION OF MEETING AGENDAS BASED ON CONTENT DISCUSSIONS AND EXPERT ASSESSMENT", which is incorporated herein by reference.

TECHNICAL FIELD

This application is directed to the field of information processing and optimization, and more particularly to the field of asynchronous dynamic generation and optimization of meeting agendas based on content discussions, expert assessment, and sentiment recognition.

BACKGROUND OF THE INVENTION

Business meetings remain a cornerstone of the modern corporate life. According to various studies, the number of daily business meeting in the US is estimated at 11 to 20 million, which translates into 220-400 million meetings per year. About 15% of an average organization's time budget is spent in meetings; according to market research, this percent is increasing every year since 2008. Moreover, middle management is spending up to 35% of their time in meetings; for upper management, this percent increases to 50.

Video conferencing is quickly becoming a major method of conducting business and personal meetings due to such key factors as an emergence of the remote and distributed global workforce (global remote workforce has increased by 140% since 2005), restrictions on in-person communications caused by the COVID-19 pandemic and a shift toward the hybrid lifestyle where distributed offices and remote work are playing an increasing role. Productivity gains from video conferencing has been captured by many polls and market studies; 43% of workers believe that video conferencing can enhance their productivity and 89% of employees who already use video conferencing state that it reduces project completion time. For corporate businesses, 78% use video conferencing to facilitate team collaboration, while 58% of businesses use video conferencing regularly, having it as part of their daily operations.

Despite numerous studies, best practices and workflow recommendations, hardware solutions, software applications and online services developed to facilitate and enhance all aspects of business meetings, ranging from early preparations to follow-ups, achieving high productivity and efficiency of meetings remains a challenging goal. Negative feelings and a sense of meeting fatigue are shared across many layers of corporate workers. According to multiple industry surveys, meetings are only 44-50% efficient, while 25% of cumulative meeting time is spent discussing irrelevant issues. In a comprehensive survey on meetings and their efficiency among 1300 business leaders from Europe and North America, 25 to 50 percent of respondents questioned the efficiency of existing meeting systems. In a 2012 work efficiency survey of 3,200 employees, 47% of participants identified corporate meetings as the single leading time-wasting factor, well ahead of every other reason for work inefficiency suggested by the survey. In a 2019 Doodle survey, 68% of US professionals complained about losing tine due to poorly organized meetings.

Irrespective of the meeting type, from company board meetings and other decision-making meetings to one-on-one manager meetings to problem solving, team building and innovation meetings, and other meeting categories in popular taxonomies, a substantial and concise meeting agenda is consistently quoted among top success factors by most sources. Thus, according to a Doodle report, the two key interrelated elements of successful meetings are setting clear objectives (72%) and a clear agenda (67%). Nevertheless, about a third of business meetings do not have an agenda at all, and a majority of meetings do not distribute agendas to attendees in advance. Even the best software titles in the meeting facilitation category don't pay serious attention to agenda development. Thus, only three of the five most popular meeting tools listed on Capterra allow very rudimentary agenda builders, combining template-based forms with form editors and designated for instant building of meeting agendas by a professional, without due consideration for the dynamic nature of meeting preparation, multiple content dependencies, and roles of different participants at multiple levels, from contributors to area experts to decision-makers.

SUMMARY OF THE INVENTION

Accordingly, it is important to develop techniques and systems for dynamic generation of meeting agendas based on projected meeting content, content prioritization and on different roles of participants of the meeting preparation process.

According to the system described herein, generating an agenda for a meeting includes creating a content repository that includes content corresponding to feedback from previous targeted meetings and/or information corresponding to ongoing discussions between potential attendees of the meeting, automatically creating a prioritized list of discussion topics based on discussions between the potential attendees of the meeting related to the content, providing the prioritized list of the discussion topics on a computer screen, at least one expert providing gestures to the computer screen to create an assessment for the discussion topics, display on the screen additional data for the prioritized list of the discussion topics, and/or transfer one or more of the discussion topics of the prioritized list of the discussion topics to either a list of dropped discussion topics or to an ordered list of selected discussion topics, and automatically generating an agenda based on the ordered list of selected discussion topics and on weights assigned to the at least one expert according to relative expertise of the at least one expert with respect to each of the discussion topics, where an order of agenda items of the agenda is based in part on the weights. The meeting may be called in response to the ongoing discussions between potential attendees. The meeting may be a targeted meeting having a preliminary agenda that is used in connection with automatically creating the prioritized list of the discussion topics. The content may include notes, documents, diagrams, charts, graphs, tables, reports, and/or schedules corresponding to the discussions. At least some of the content may be provided by cloud data. Automatically creating a prioritized list of the discussion topics may include automatically processing the discussions using natural language processing, sentiment recognition technology and a content classifier. Automatically creating a prioritized list of the discussion topics may use unanswered questions related to a preliminary agenda of a targeted meeting, unresolved conflicts or disputes, identified problems, and/or similarities to topics from similar ones of the previous targeted meetings from the content repository. Similar topics may be grouped together. The at least one expert may add at least one discussion topic to the ordered list of selected discussion topics. The agenda may be modified to reorder and/or remove at least some of the agenda items. The weights may be periodically adjusted based on success or failure of expert recommendations with respect to each of the discussion topics and corresponding ones of the agenda items. A machine learning algorithm may adjust the weights based on a number of the discussion topics recommended by the at least one expert that are adopted for the agenda by a decision maker and on a number of the discussion topics recommended by the at least one expert that are eliminated from the agenda by the decision maker. The agenda items may be characterized according to a quantified assessment of importance of each of the agenda items by the at least one expert and according to expected meeting duration time of each of the agenda items. An ordering of the agenda items may be based on the quantified assessment of importance and the expected meeting duration time of each of the agenda items. The ordering of the agenda items may maximize a sum of each of the quantified assessments of importance in a total amount of time allotted to the meeting. The agenda items may be ordered according to the quantified assessment of importance of each of the agenda items in a total amount of time allotted to the meeting. The meeting may be subdivided into a plurality of smaller meetings having different subsets of the potential attendees of the meeting. Generating an agenda for a meeting may also include assigning a weight to each of the agenda items that corresponds to a relative importance of each of the agenda items, estimating a duration of each of the agenda items, estimating a relevance of each of the agenda items to attendees of each of the smaller meetings, and assigning a subset of the agenda items to each of the smaller meetings based on the weight, the duration, and the relevance of each of the agenda items. Assigning a subset of the agenda items to each of the smaller meetings may maximize a sum of the weights while satisfying a first restriction that ensures that a meeting time budget is not exceeded and a second restriction that each of the smaller meetings only includes relevant agenda items.

According further to the system described herein, a non-transitory computer readable medium contains software that generates an agenda for a meeting. The software includes executable code that creates a content repository that includes content corresponding to feedback from previous targeted meetings and/or information corresponding to ongoing discussions between potential attendees of the meeting, executable code that automatically creates a prioritized list of discussion topics based on discussions between the potential attendees of the meeting related to the content, executable code that provides the prioritized list of the discussion topics on a computer screen, executable code that receives input from at least one expert that provides gestures to the computer screen to create an assessment for the discussion topics, displays on the screen additional data for the prioritized list of the discussion topics, and/or transfers one or more of the discussion topics of the prioritized list of the discussion topics to either a list of dropped discussion topics or to an ordered list of selected discussion topics, and executable code that automatically generates an agenda based on the ordered list of selected discussion topics and on weights assigned to the at least one expert according to relative expertise of the at least one expert with respect to each of the discussion topics, where an order of agenda items of the agenda is based in part on the weights.

The proposed system offers asynchronous dynamic development of meeting agendas for synchronous targeted and ad hoc meetings and for asynchronous on-going activities based on content submissions and discussions, weighted expert assessment, adviser reviews and decision-maker approvals; an agenda generation workflow uses natural language processing, sentiment recognition, machine learning and optimization technologies. Generated agendas are translated into optimal meeting schedules and may be distributed between multiple meetings.

Various aspects of system functioning are explained as follows.

1. Meeting types. The system dynamically generates agendas for targeted and ad hoc meetings; agendas may also serve as action plans, blueprints, or roadmaps for ongoing asynchronous activities.

Targeted meetings are meetings anticipated by an organization that gain efficiency from well-designed agendas. Examples include company board meetings, weekly planning meetings, regular sales and marketing meetings, all-hands meetings, one-on-one manager meetings, product status, release meetings, etc.

Ad hoc meetings are spontaneous and may be reflecting changing environment, demands, unforeseen events, etc., such as engineering problem-solving or discovery meetings, evolving changes in a supply chain, other situations where on-going projects or discussions necessitate a synchronous exchange of information, opinions, or decisions.

2. Participants and roles. A dynamic agenda is a product of asynchronous collaboration between several groups of participants of the agenda generation process and workflow. These groups of participants may be representing four different roles: content contributors, area experts, advisers, and decision-makers, as explained in detail below.

3. Technology stack. The system may employ various technologies for automatic processing, ranking, and optimization at various phases of the dynamic agenda generation workflow. The technology stack may include Natural Language Processing (NLP), Sentiment Recognition, Machine Learning, multi-criteria optimization algorithms, etc.

4. System workflow. Dynamic agenda creation workflow is a bottom-up multi-step process that may include four phases:

(i) Building a content repository, conducting, processing and prioritizing content discussions and determining a prioritized list of discussion topics.

(ii) Conducting expert assessment of a prioritized list of discussion topics, selecting and processing most relevant topics and generating a draft agenda.

(iii) Reviewing the draft agenda by advisers and building a final draft agenda.

(iv) Presenting the final draft agenda to decision-makers, determining interest of the decision makers in particular agenda items and obtaining approval for the final agenda.

5. Functional chart. Further breakdown of the workflow and its phases by steps and functions is as follows:

(a) Content for a targeted meeting may be directed by a preliminary agenda. A preliminary agenda may be proposed by a decision-maker, for example, a CEO or a board member in case of a company board of directors meeting, may be associated with the minutes of a previous meeting, with an upcoming event, a product release, etc.

(b) At a first phase of the process (phase 4(i) of the workflow), contributors may be adding content to the repository, enriching the repository from different sources, including the cloud, and may be engaging into discussions related to various content items with different types of information, such as documents, graphs, worksheets. Subsequently, the system may automatically process discussions using NLP, Sentiment Recognition, automatic classifiers obtained though Machine Learning, and other technologies and may prioritize discussions based on several notions and criteria brought up by the content discussions:

unanswered questions;
unresolved conflicts or disputes;
identified problems;
similarities to topics from a preliminary agenda when such agenda is offered and when the preliminary agenda is driving content accumulation and some of the discussions.
Similar topics may be grouped at the processing phase, while neutral and dull discussions may be dismissed.
The outcome of automatic processing at this phase may be summarized as a prioritized list of discussion topics.

(c) At a second phase 4(ii), experts may be assessing the prioritized list of discussion topics (the outcome of the first phase) and may be selecting topics for potential inclusion into the meeting agenda. Subsequent automatic processing using NLP and abstraction technologies may help generate a list of draft agenda items. Experts may also generalize discussion topics in their area of expertise and suggest their own items for the draft agenda.

(d) At the next, third phase 4(iii) of the dynamic agenda development process, advisers (such as top-level company managers—CTO, CFO, CIO, CMO) may review the proposed draft agenda and develop a final draft agenda for decision-makers (CEO, Board of Directors, etc.); advisers may use voting for recommending inclusion or dropping contentious agenda items from the final draft agenda.

(e) At the final stage 4(iv) of the dynamic agenda development, one or multiple decision-makers express interest level(s) to various topics on the final draft agenda and approve the final agenda.

6. Using and adjusting expert weights. Each expert $E_i$ may have one or more expertise domains and may be assigned a weight $w_i$. An agenda value of a discussion topic from the prioritized list assessed by experts may be calculated using the formula:

$$\mathcal{V}(d) = \sum_{d \in \mathcal{C}(E_i)} w_i,$$

where d is a discussion topic and $\mathcal{C}(E_i)$ are the choices of discussion topics by the expert $E_i$ (under the assumption that the topic d belongs to at least one of the expert's expertise domains, so the expert $E_i$ is qualified to assess the discussion topic).

Subsequently, the draft agenda is compiled from the discussion topics on the prioritized list that have the top agenda values derived from the above formula. Additional cut-off criteria and restrictions may be applied to finalize the draft agenda, such as a maximum feasible length of the draft agenda or a minimum acceptable agenda value based on the current weights of the expert team.

Expert weights may be periodically adjusted using different methods. One of the methods may be based on the success and failure outcomes of expert recommendations on the agenda items and is applied as follows. At the phases 4(iii) and 4(iv) of the functional chart, explained in Section 5 above, the draft agendas, dynamically developed with the expert assistance, are transformed into the final draft agendas and the final agendas. Accordingly, some of the draft agenda items may make it all the way into the final agendas, while other items may be dropped halfway to the final agendas. An expert success indicator $\mathcal{E}_i^+$ and a failure indicator $\mathcal{E}_i^-$ for an expert $E_i$ may be expressed as $$\mathcal{E}_i^+ = \{\mathcal{C}_{(E_i)} \cap \mathcal{A}_f [\mathcal{A}_{fd}]\}$$

$$\mathcal{E}_i^- = \{\mathcal{C}_{(E_i)} \setminus \mathcal{A}_f [\mathcal{A}_{fd}]\}$$

where $\mathcal{A}_f$ and $\mathcal{A}_{fd}$ are the lists of topics included in the final and the final draft agendas. That is, the success/failure indicators of an expert are a set of subsets of prioritized discussion topics that the expert correctly/incorrectly included on the draft agenda. The indicators may be used as inputs to Machine Learning algorithms for periodic adjustment of expert weights based on success and unsuccess of assessments of the experts for the dynamic agenda development.

7. Optimizing meeting schedules. Once a final meeting agenda has been dynamically developed and designated for a synchronous meeting (as opposed to a blueprint or a roadmap for ongoing activities and projects), the system may optimize meeting schedules based on the agenda. There are several distinct meeting environments and corresponding optimization scenarios:

A. A dynamically developed agenda may be only a part of the complete meeting agenda; for example, a board meeting may have a standard portion of the agenda that doesn't change from meeting to meeting, so the dynamically developed agenda must complement the meeting schedule.

B. The agenda may be split between multiple meetings at different times or between several levels of an organizational hierarchy, such as a company board at subcommittees of the company board.

Two potential optimization models for non-hierarchic synchronous meetings may include:

Packing from top $$\max\left\{m \,\middle|\, \sum_1^m \tau_j < t\right\}$$

Packing by weight $$\max\{\Sigma w_j | \Sigma \tau_j < t\}\}$$

where t is the duration of the meeting or of part of the meeting designated for the topics of the dynamically developed agenda;

$(w_j, \tau_j)$ are weights and durations of the agenda items ordered by decreasing weight. Both methods determine the portion of a developed dynamic agenda that can be discussed in the meeting.

For the hierarchic meetings, the optimization model splits the agenda into multiple meeting agendas $P^k$ held by the committee (for example, a company's Board of Directors) and corresponding subcommittees by maximizing the summary weight (objective function) of the agenda partition satisfying all necessary conditions:

$$\max_{|\mathcal{P}|\le n}\left(\sum_{k=1}^{|\mathcal{P}|}\sum_{j\in P^k} w_j \,\middle|\, \forall\, k \le |\mathcal{P}|, \sum_{j\in P^k}\tau_j < t^k \,\&\, \forall\, j \in P^k, r_j^k > 0\right)$$

where ($w_j$, $\tau_j$, $\{r_j^k\}$) are weights and durations of the agenda items and binary values of relevance of the jth agenda item to the kth entity (the committee or one of the subcommittees)–$r_j^k=1$ if and only if the jth agenda item is relevant to the kth subcommittee and can be included on an agenda for that subcommittee;

$|\mathcal{P}|$ is the total number of meeting agendas generated from the original agenda;

$t^k$ is the time available for the meeting at the kth entity.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for asynchronous dynamic development of meeting agendas for synchronous targeted and ad hoc meetings and for asynchronous on-going activities based on content submissions and discussions, weighted expert assessment, adviser reviews and decision-maker approvals.

Figure 1A:
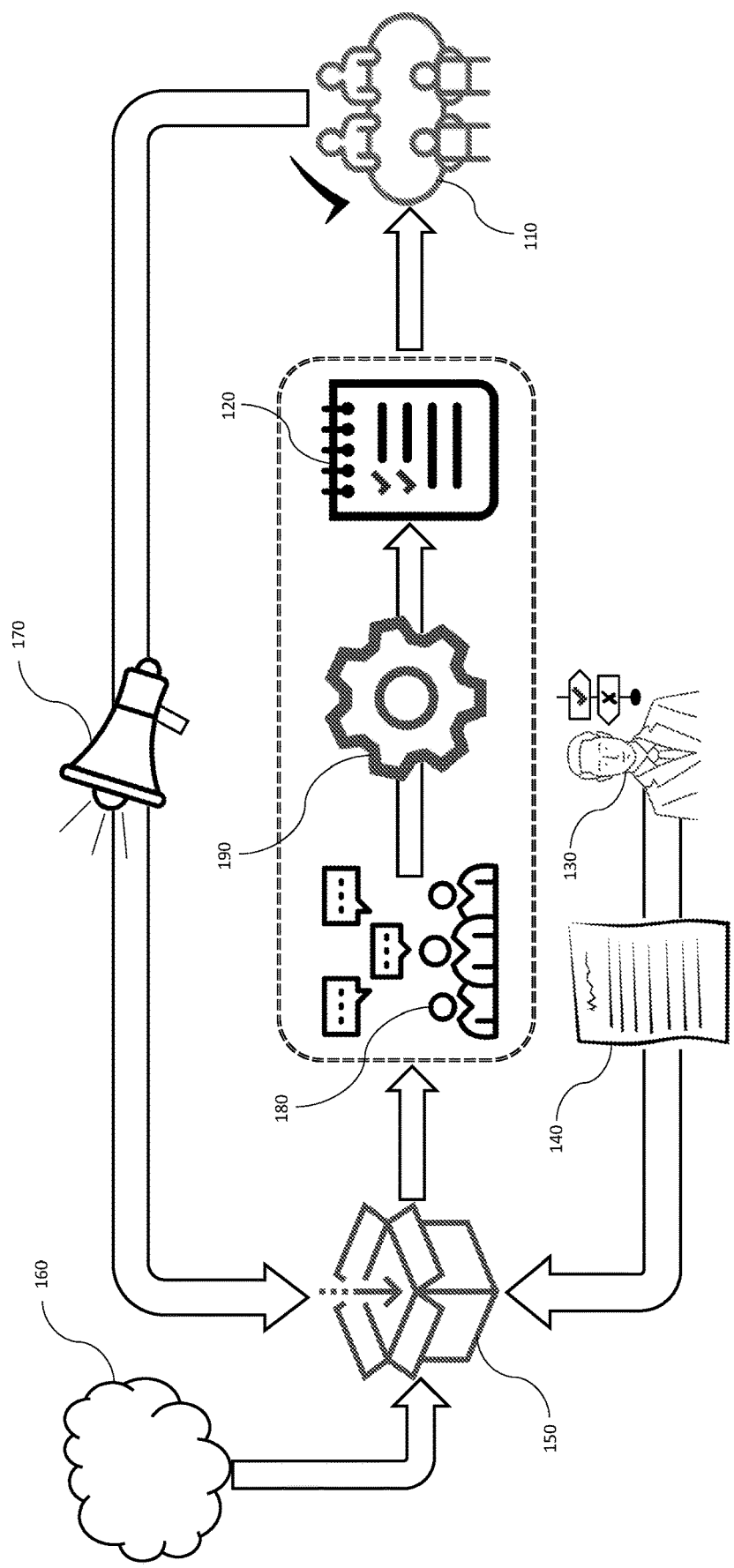
FIGS. 1A-1B are schematic illustrations of dynamic creation of a meeting agenda for a targeted meeting and of discussion driven dynamic ad hoc creation of a meeting agenda, according to an embodiment of the system described herein.
Figure 1B:
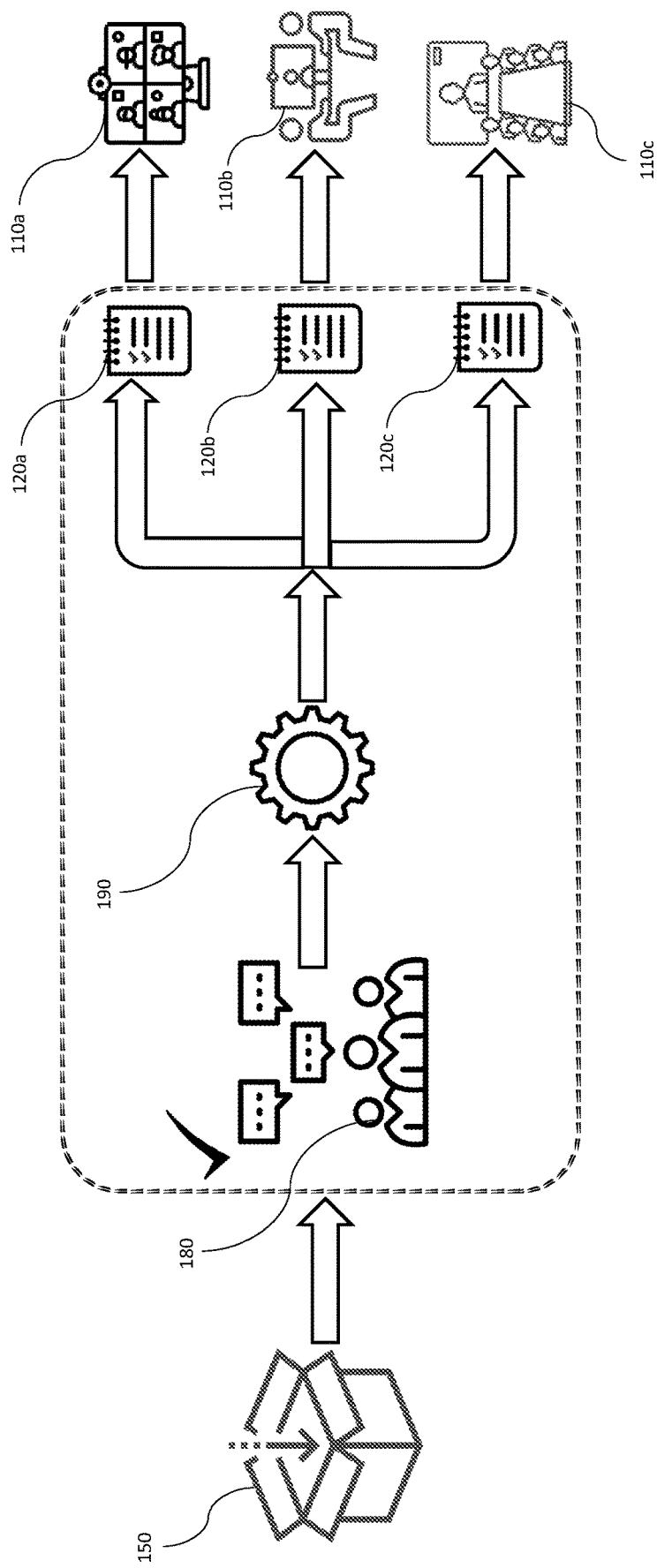

FIGS. 1A-1B are schematic illustrations of dynamic creation of a meeting agenda for a targeted meeting and of discussion driven dynamic ad hoc creation of a meeting agenda.

FIG. 1A schematically illustrates a process and workflow of the dynamic creation of a meeting agenda for a targeted meeting. A targeted meeting 110 has an agenda 120 dynamically created when a decision-maker 130 suggests a preliminary agenda 140 for discussion. A relevant content repository 150 for discussions regarding the preliminary agenda 140 is created from various sources, including a cloud 160 and feedback 170 from other targeted meetings, which could include a follow-up from a preceding meeting on the same subject. Content of the content repository 150 becomes part of discussions 180, which are processed by an agenda creation technology stack, resulting in the agenda 120, as explained elsewhere herein (see, for example, FIG. 2 for a detailed functional chart and FIG. 3 for discussion processing methods).

FIG. 1B schematically illustrates a process and workflow of discussion driven dynamic ad hoc creation of meeting agendas. The content repository 150 includes ongoing discussions on various topics, which do not necessarily have an explicit goal to create meeting agendas. However, after processing the content related discussions 180 by an agenda creation technology stack 190, it turns out that multiple ad hoc meetings 110a, 110b, 110c are required to solve problems uncovered thereby, overcome the conflicts, and answer questions raised throughout the discussions. The system provides optimal agendas 120a, 120b, 120c for resulting meetings.

Figure 2:
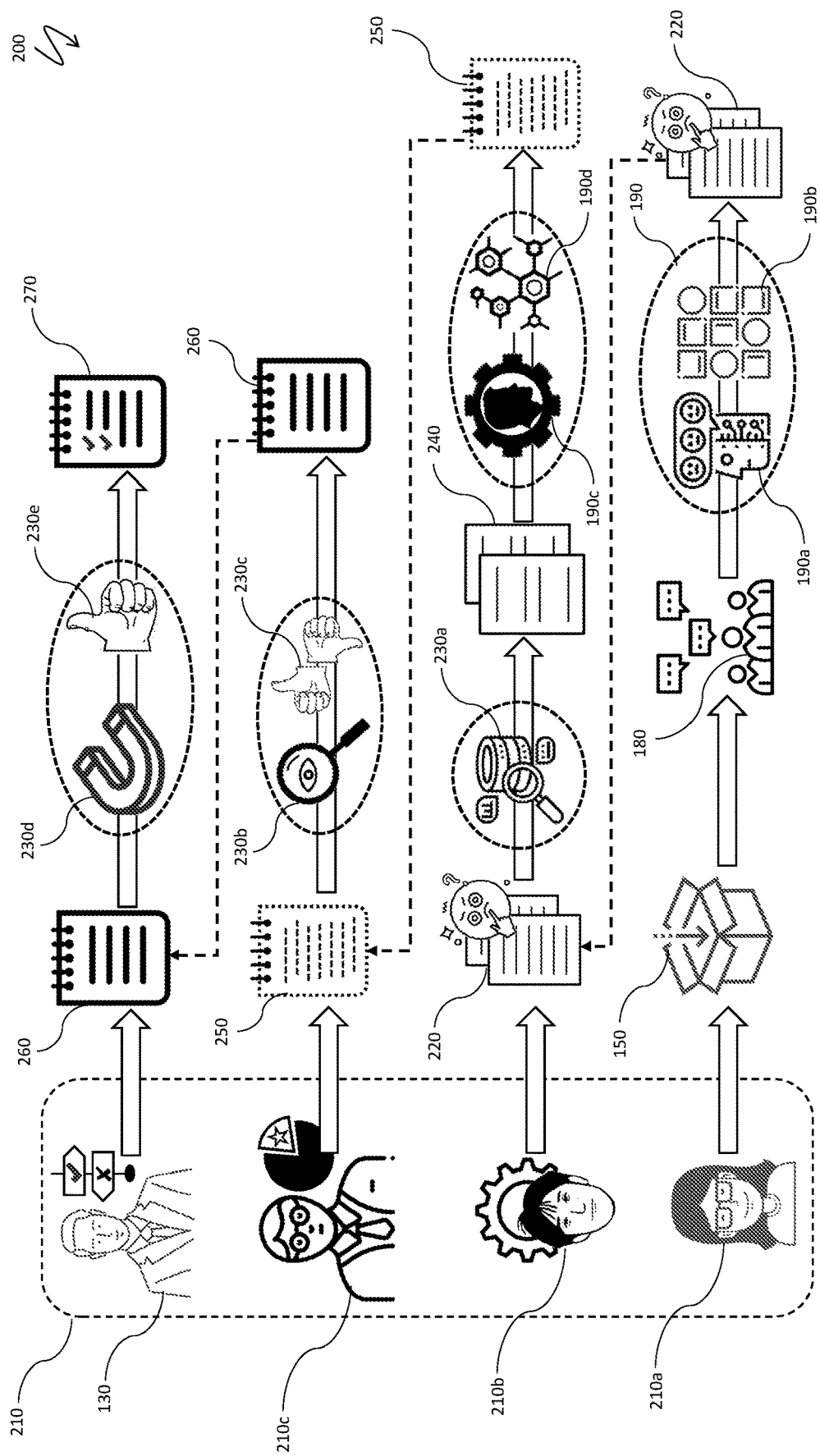
FIG. 2 is a schematic illustration of the functional chart for dynamic agenda creation, according to an embodiment of the system described herein.

FIG. 2 is a schematic illustration 200 of a functional chart for dynamic agenda creation. The chart includes four phases of the agenda creation, as generally explained elsewhere herein (see, in particular, phases 4(i)-4(iv) in Sections 4, 5 of the Summary). At the first phase, content contributors 210a build and enrich the content repository 150; certain content items may become the subject of the discussions 180. Discussion materials may be automatically processed using the agenda creation technology stack 190, including sentiment recognition technology 190a and a content classifier 190b. This may result in creation of a prioritized list of discussion topics 220 (see FIG. 3 and the accompanying text for more information).

At a second phase of the functional chart, the prioritized list of discussion topics 220 may be handled by an expert, or a group of experts 210b who make an assessment 230a and may abandon some of the topics on the list 220 and produce a list of selected topics 240. The list 240 may be, in its turn, additionally processed by automatic tools from the technology stack, such as an NLP technology 190c and a neural network classifier 190d, grouping and adjusting entries of the list 240 and creating a draft agenda 250, possibly with participation by the experts 210b.

At the third phase, the draft agenda 250 may be managed by an adviser or a group of advisers 210c who provide a review 230b of the draft agenda 250 and, optionally, a vote 230c to further amend the draft agenda 250 and generate a final draft agenda 260.

At the final, fourth phase of the functional chart, the decision-maker 130 obtains the final draft agenda 260, indicates a degree of interest 230d in the final draft agenda 260, potentially truncates or otherwise amends the final draft agenda 260 and makes an approval 230e for a final agenda 270.

(Note that the content repository 150 may or may not include a preliminary agenda proposed by the decision-maker 130 (item 140 in FIG. 1A, not shown in FIG. 2) and/or other content items related to the preliminary agenda)

Figure 3:
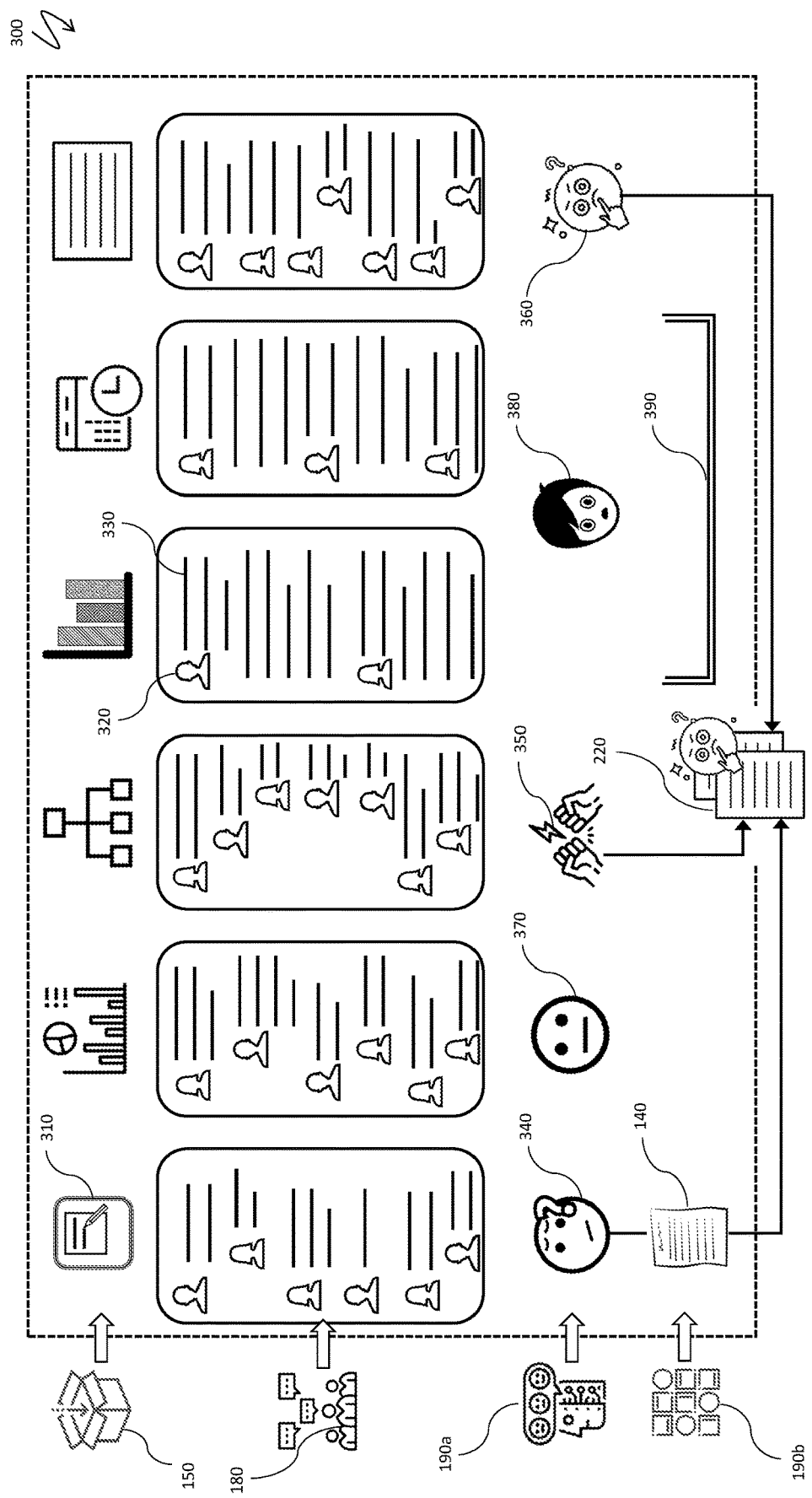
FIG. 3 is a schematic illustration of processing and prioritizing content related discussions, according to an embodiment of the system described herein.

FIG. 3 is a schematic illustration 300 of processing and prioritizing content related discussions. Content items 310 from the content repository 150 may include various types of notes, documents, diagrams, charts, graphs, tables, reports, schedules, etc. The discussions 180 concerning the content items 310 are illustrated in FIG. 3 as multiple discussion threads in a forum (or chat) format; each discussion includes participants 320 and discussion items 330 (comments, quotes, replies, opinions, etc.) entered in text or other formats.

The sentiment recognition technology component 190a of the technology stack (see FIG. 2) may assess each discussion upon completion of the discussion or may synchronously determine various attitudes of the participants and emotional outcomes of the discussions. Some of the attitudes and outcomes may boost priorities of the discussion topics and contribute to inclusion of topics on the prioritized list of the discussion topics 220 (the outcome of the phase 1 of the functional chart in FIG. 2). Examples of prioritized items resulting from the sentiment recognition may include:

Unanswered questions 340 related to the preliminary agenda 140 (see FIG. 1 for more information) —the relation between the questions and the preliminary agenda 140 may be established using the automatic classifier 190b, which, in its turn, may rely upon the NLP technology 190c (not shown in FIG. 3).

Unresolved conflicts and disputes 350.

Discovered problems 360 that have not been sufficiently addressed and resolved in the discussion threads.

In contrast, neutral attitudes 370 of discussion participants and non-problematic/non-conflicting outcomes of the discussions, as well as dull discussions 380 (grouping 390 shows multiple discussions with similar outcomes) lead to abandonment of corresponding discussion topics in the development process of meeting agendas.

Figure 4:
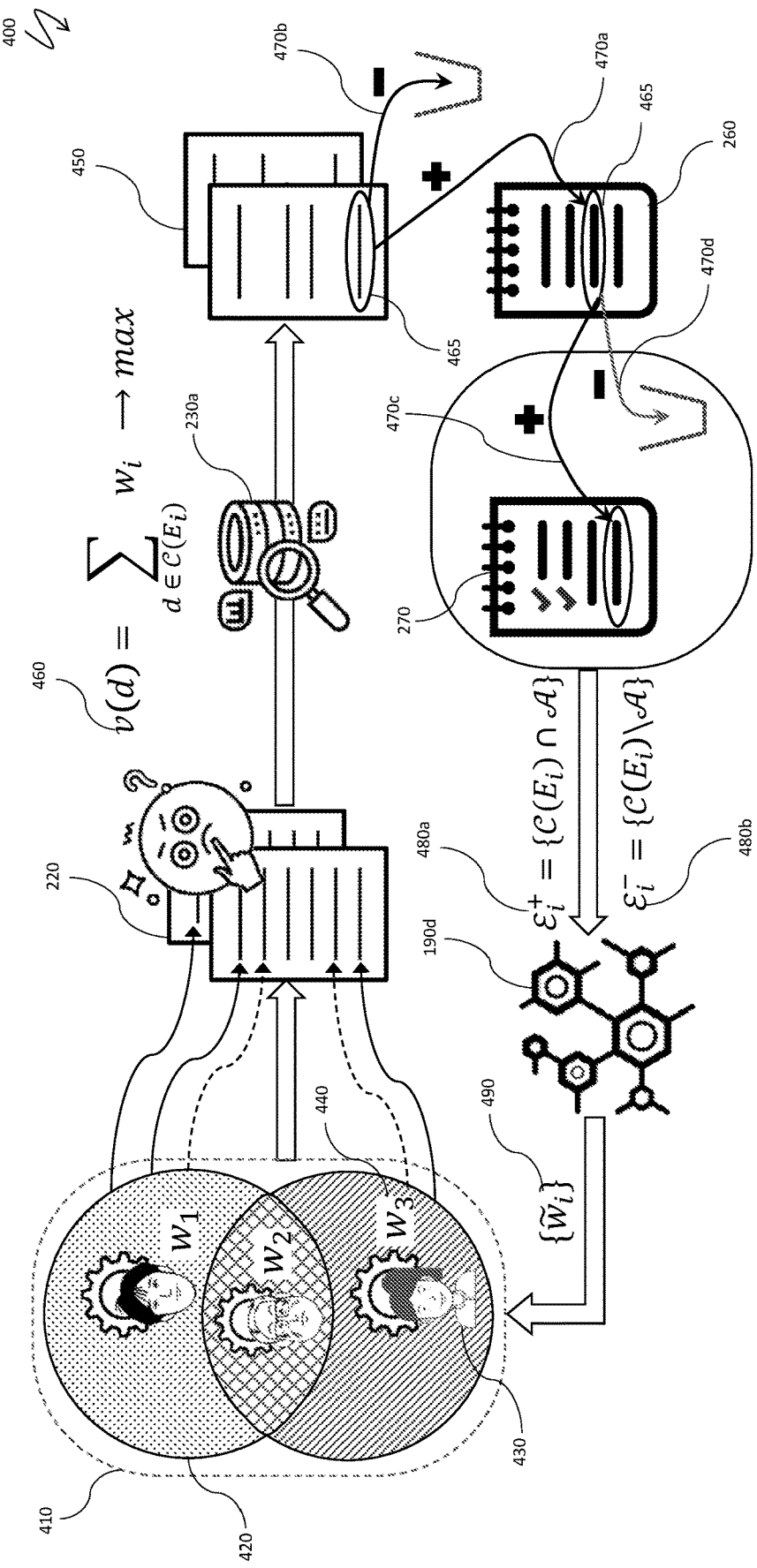
FIG. 4 is a schematic illustration of an expert assessment and of an adjustment of expert weights, according to an embodiment of the system described herein.

FIG. 4 is a schematic illustration 400 of an expert assessment and of an adjustment of expert weights. An expert pool 410 is subdivided into expertise domains 420 and each individual expert 430 may assess subjects belonging to one or more expertise domains and is assigned an adjustable weight 440. When a prioritized list of the discussion topics 220 is submitted for the assessment 230a (see FIG. 2 and the accompanying text for more information and FIG. 3 for the construction methods for the list 220), individual experts, upon making a determination, may add a subset of items from the list 220 to a list of selected topics 450 and drop remaining items, as shown by solid arrows (retain) and dashed arrows (drop) leading from expertise domains to the list 220 (note that FIG. 4 is illustrating an assumption that experts from two different expertise domains are qualified to assess the list 220).

The combination of expert choices drives the formation of a list of selected topics 450 (represented here as the collective optimal expert choice) based on a solution of an optimization task 460, explained in Section 6 of the Summary. The draft agenda 250 (not shown in FIG. 4) is an additional restriction of the list of selected topics 450.

An item 465 on the list of selected topics 450 may be accepted or rejected for an inclusion on the final draft agenda 260 formed by the advisers (see FIG. 2 and the accompanying text for the explanation of the final draft agenda 260); this is shown by arrows 470a (acceptance) and by other arrows 470b (rejection). If the item 465 is rejected, it may be considered a failure by any expert who has chosen the item 465 for inclusion on the list of optimal choices 450 and at least a neutral situation or possibly a small win for any expert who dropped the item 465 from the individual choice. In the same way, an item 465 that made it to the draft agenda 260 may be accepted or rejected by the decision-maker 130 for an inclusion on the final agenda 270; as previously, an arrow 470c indicates acceptance and an other arrow 470d means rejection. The same arguments apply to advantages and disadvantages of each choice of each expert.

Accordingly, after a full cycle of agenda development is complete, the system may form two sets 480a in favor of choices of each of the experts (as explained in Section 6 of the Summary, the agenda $\mathcal{A}$ in the expression 480a may be a final draft agenda $\mathcal{A}_{fd}$ or a final agenda $\mathcal{A}_f$); analogously, two sets 480b may be formed against choices of each of the experts. The sets are accumulated for a certain period of time across multiple agenda development tasks and may be used as a training set or a session for the Machine Learning 190d or other weight rebalancing method for a periodic adjustment of expert weights 490.

Figure 5:
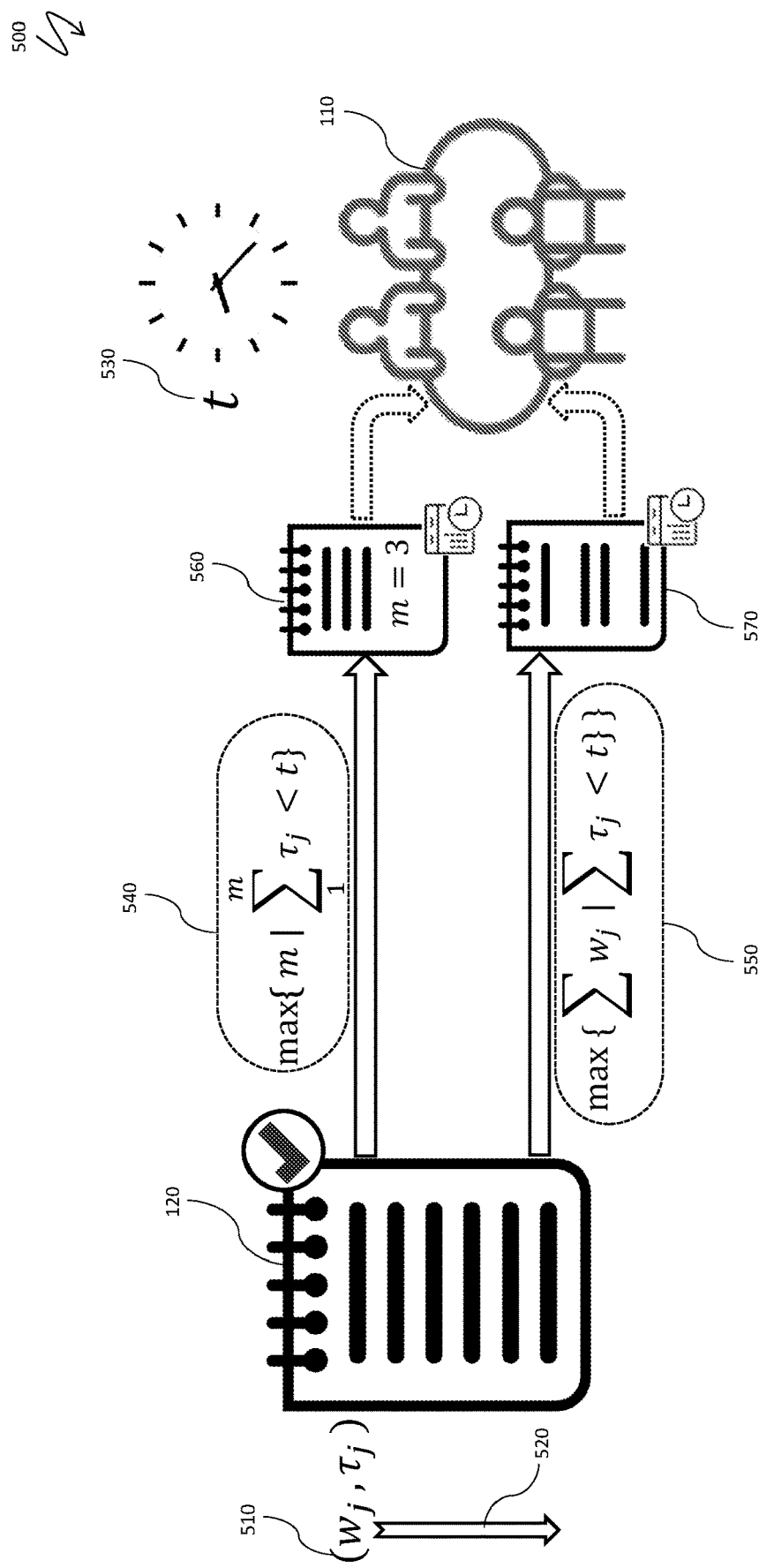
FIG. 5 is a schematic illustration of schedule optimization for a single targeted meeting, according to an embodiment of the system described herein.

FIG. 5 is a schematic illustration 500 of schedule optimization for a single targeted meeting. Items of the agenda 120 for the targeted meeting 110 are characterized by tuples 510 (weight, duration), whereby the weights reflect relative importance of agenda items; the agenda items are ordered by the decreasing weights, as indicated by an arrow 520. A total time for presenting and discussing all items on the agenda 120 may be limited by a meeting duration 530, which may also designate time remaining after proceeding with a mandatory part of the agenda 120, whereby the agenda 120 may include an additional portion.

Two methods of schedule optimization under these conditions are a packing from top method 540 and a packing by weight method 550, as explained elsewhere herein (see Section 7 of the Summary). Under the packing from top method, the agenda includes several top items by weight added to the schedule as long as a sum of a duration of the items does not exceed a meeting duration limit. The packing from top method yields a schedule 560; in FIG. 5, the schedule 560 has three most important among the agenda items. After the schedule 560 has been determined, items in the schedule 560 may be rearranged by the decision-maker 130, meeting organizers or participants. Under the packing by weight method, all agenda items may participate in the schedule and the optimization task is a linear programming task, maximizing the sum of weights under the restriction that the sum of a duration of the items does not exceed a meeting duration limit 530. A schedule 570 delivered by the packing by weight method may also have agenda items reshuffled prior to a corresponding meeting.

Figure 6:
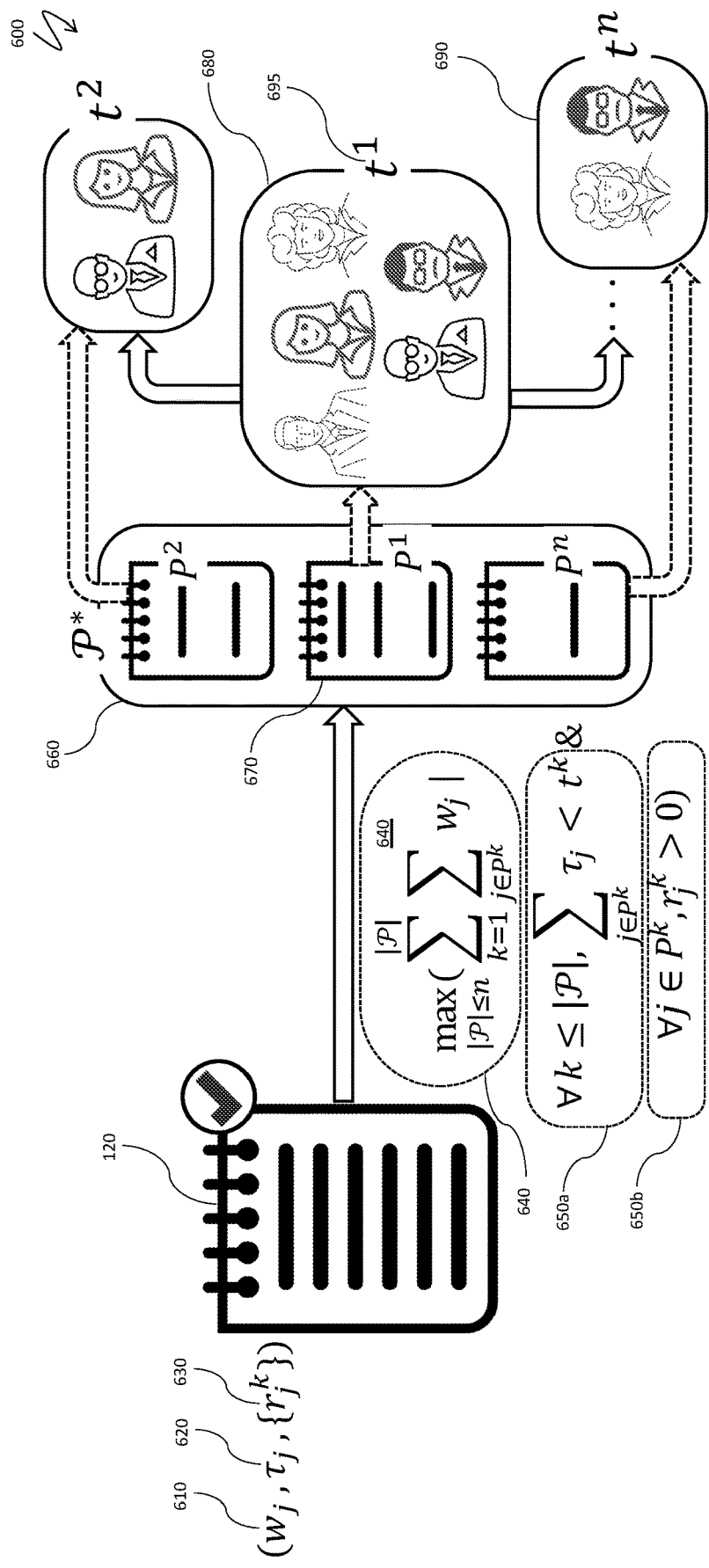
FIG. 6 is a schematic illustration of schedule optimization for a board or a committee with subcommittees, according to an embodiment of the system described herein.

FIG. 6 is a schematic illustration 600 of schedule optimization for a board or a committee with subcommittees. The original agenda 120 has been dynamically created through a process explained in connection with FIGS. 2-4 and is implemented within a structure that includes a board/committee 680 and subcommittees 690 of the board/committee 680; the agenda 120 has not been adapted yet and a schedule based on the agenda 120 is to be optimized. In this case, the agenda 120 may be optimally distributed between the board/committee 680 and the subcommittees 690. The board/committee 680 and the subcommittees 690 may each have a time budget 695 limiting discussions on items of the agenda 120.

Each agenda item is characterized by three parameters. The first two parameters, weight 610 and estimated duration 620 of an agenda item, are analogous to similar variables shown in FIG. 5; the third parameter is a set 630 of binary values determining relevance of an agenda items to certain subcommittees: a value $r_j^k$ equals 1 for a parameter 630 if and only if the jth agenda item is relevant to the kth subcommittee and can be included on an agenda for the kth subcommittee.

The optimization task to partition the agenda 120 into a set of sub-agendas for the board and the subcommittees is discussed in the Section 7 of the Summary. The optimization task is formulated as a maximization of an objective function 640, delivering a maximum possible sum of weights of agenda items satisfying two restrictions: a restriction 650a makes sure that the meeting time budget is respected for the board (committee) 680 and for each of the subcommittees 690, and a restriction 650b ensures that each of the subcommittees 690 has only relevant agenda items on a schedule for each of the subcommittees 690.

An optimal schedule is an agenda partition 660, offering a relevant and a time-conscious partial agenda 670 to the committee 680 and to some or all of the subcommittees 690.

Figure 7:
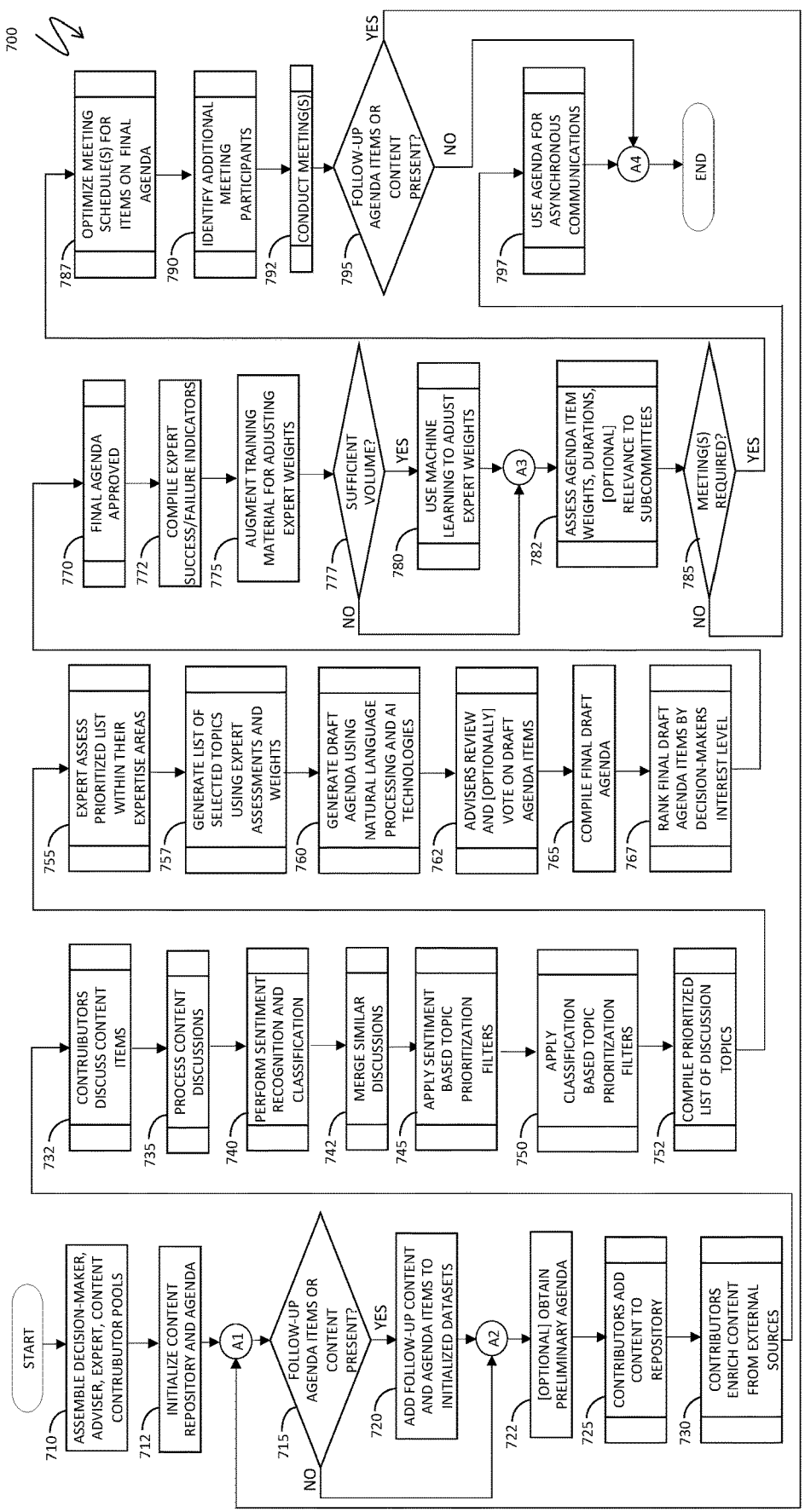
FIG. 7 is a system flow diagram illustrating system functioning in connection with asynchronous dynamic development of meeting agendas, according to an embodiment of the system described herein.

Referring to FIG. 7, a system flow diagram 700 illustrates system functioning in connection with asynchronous dynamic development of meeting agendas. Processing begins at a step 710, where a pools of decision-makers and/or advisers are assembled. After the step 710, processing proceeds to a step 712, where the content repository and the agenda are initialized. After the step 712, processing proceeds to a test step 715, where it is determined whether there are follow-up agenda items or content from previous meeting that precede the current run of the system. If so, processing proceeds to a step 720, where the follow-up agenda items and content are added to the initialized datasets. After the step 720, processing proceeds to a step 722 (optional), where a preliminary agenda is obtained (see FIG. 1 for more information). Note that the step 722 may be independently reached from the test step 715 if it is determined the follow-up agenda and content are absent. After the step 722, processing proceeds to a step 725, where the contributors add content to the repository. After the step 725, processing proceeds to a step 730, where the contributors enrich content from various external sources.

After the step 730, processing proceeds to a step 732, where the contributors discuss content items. After the step 732, processing proceeds to a step 735, where the system processes content discussions and collects information, as explained elsewhere herein (see, for example, FIG. 3 and the accompanying text). After the step 735, processing proceeds to a step 740, where the system performs sentiment recognition and classification using information collected at the previous step 735, as explained elsewhere herein (see, for example, FIG. 3 and the accompanying text). After the step 740, processing proceeds to a step 742, where similar discussions are merged from the standpoint of prioritization. After the step 742, processing proceeds to a step 745, where the sentiment-based prioritization filters are applied to discussion topics (see, for example, items 350, 360 in FIG. 3 and the explanation in the accompanying text). After the step 745, processing proceeds to a step 750, where the classification-based prioritization filters are applied to discussion topics. After the step 750, processing proceeds to a step 752, where the system compiles a prioritized list of discussion topics (see item 220 in FIGS. 2-4).

After the step 752, processing proceeds to a step 755, where experts assess the prioritized list of discussion topics within their expertise areas (see FIGS. 2, 4 and the accompanying texts for more information). After the step 755, processing proceeds to a step 757, where expert assessments and expert weights contribute to generating a list of selected topics (see FIG. 4 and Section 6 of the Summary for explanations). After the step 757, processing proceeds to a step 760, where a draft agenda is generated from the list of selected topics using NLP and AI (see FIG. 2 and the accompanying text for explanations).

After the step 760, processing proceeds to a step 762, where advisers review draft agenda items and may optionally vote on the agenda items. After the step 762, processing proceeds to a step 765, where the final draft agenda is compiled (which completes the third phase of agenda creation, as explained in the Summary and in FIG. 2 and the accompanying text). After the step 765, processing proceeds to a step 767, where the items of the final draft agenda are ranked by interest level of the decision maker. After the step 767, processing proceeds to a step 770, where the final agenda is approved and the fourth and the final phase of the agenda creation is complete.

After the step 770, processing proceeds to a step 772, where expert success/failure indicators are compiled for the current agenda (see FIG. 4 and the accompanying text). After the step 772, processing proceeds to a step 775, where the training material for adjusting expert weights is augmented by adding the current success/failure indicators. After the step 775, processing proceeds to a test step 777, where it is determined whether there is a sufficient volume of training material to adjust expert weights. If so, processing proceeds to a step 780, where expert weights are adjusted using Machine Learning, as described elsewhere herein. After the step 780, processing proceeds to a step 782, where the system assesses the weights and estimated durations of the agenda items, and, if applicable, the relevance of agenda items to the subcommittees. Note that the step 782 may be independently reached from the test step 777 if it was determined that the volume of training material to update expert weights is insufficient.

After the step 782, processing proceeds to a test step 785, where it is determined whether the developed agenda requires synchronous meetings. If so, processing proceeds to a step 787, where a meeting schedule is optimized for the items on the final agenda, which includes all optimization methods and meeting organization cases explained in FIGS. 5, 6 and the accompanying texts. After the step 787, processing proceeds to step 790, where additional meeting participants are identified as needed. After the step 790, processing proceeds to a step 792, where the meetings are conducted. After the step 792, processing proceeds to a test step 795, where it is determined whether any follow-up agenda items or content remain after the meetings are conducted. If not, processing is complete; otherwise, processing proceeds to the test step 715, which may be independently reached from the step 712.

If it is determined at the test step 785 that the synchronous meetings based on the final agenda are not required, processing proceeds to a step 797, where the agenda is used for asynchronous communications. After the step 797, processing is complete.

Figure 8:
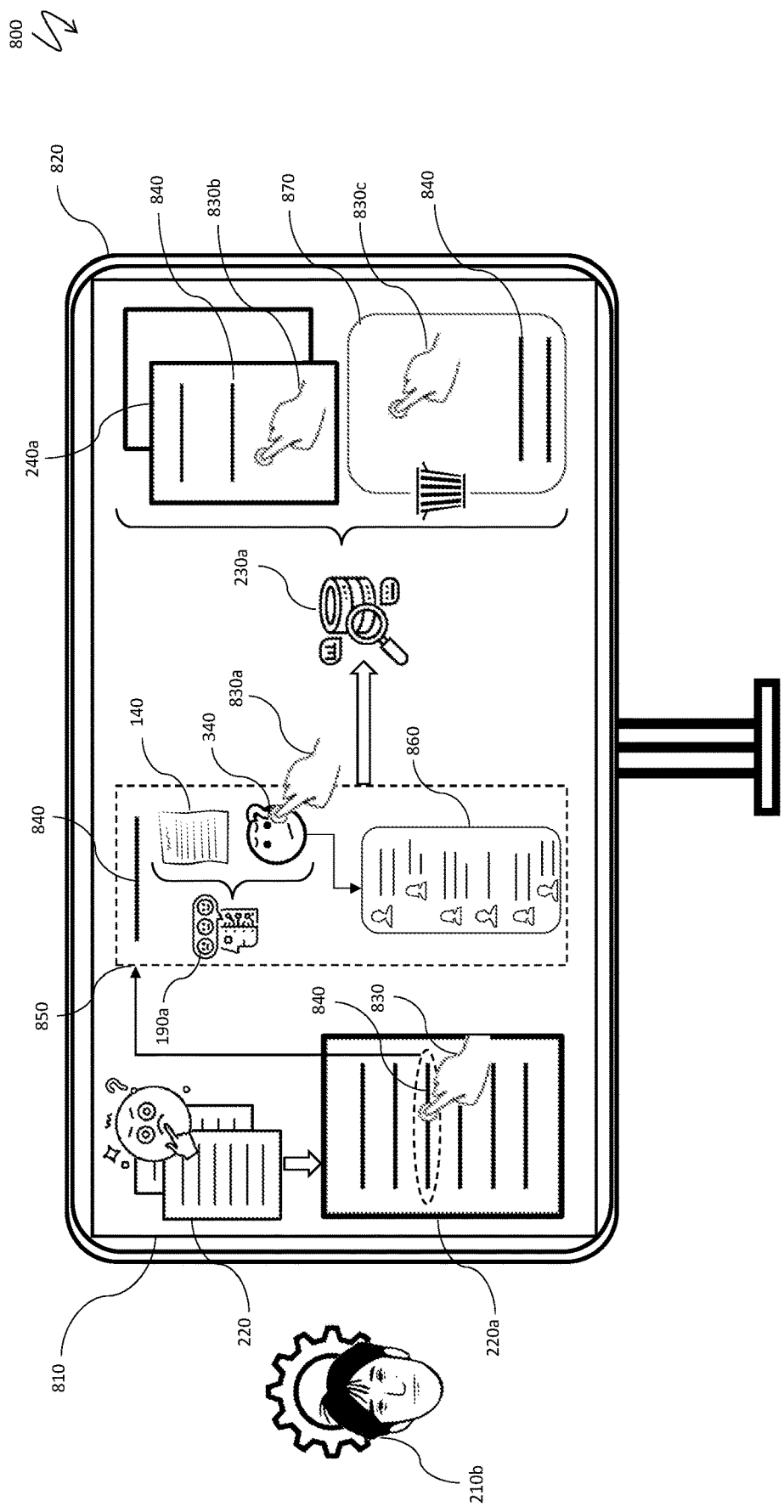
FIG. 8 is a schematic illustration of a user interface operated by an expert, according to an embodiment of the system described herein.

FIG. 8 is a schematic illustration 800 of a user interface actuated by an expert to provide expert assessments, as described elsewhere herein. An expert assessment application allows an expert to perform a comparative assessment of various items from the prioritized list of discussion topics and incrementally build a list of selected topics, which is subsequently automatically transformed into a draft agenda (see FIG. 2 and the accompanying text for more information).

An expert 210b interacts with an expert assessment application 810, shown on a computer screen 820. The expert user interface of the application 810 includes four sections:

a. An original prioritized list of the selected topics 220 is enlarged into an operable list 220a. The expert 210b may perform a gesture 830 on a touch screen (such as a tap, tap and hold, drag, etc.), a mouse cursor on a conventional screen or another similar pointing solution to select an item 840 from the list.

b. If the expert 210b needs more information on the selected item 840, then, upon electing an item 840, an explanatory data section 850 is opened, the item 840 is copied into that section and the results of the sentiment recognition 190a from appropriate discussion thread(s) are displayed in the section 850 (see FIG. 3 for details). In the example of FIG. 8, the selected item 840 represents an unanswered question 340 related to the preliminary agenda 140 offered by the decision-maker 130 for discussion (see FIGS. 1A, 3 for definitions, system workflow and discussion specifics).

The expert 210b may obtain further details in the explanatory data section 850; here, after performing another touch gesture 830a, the expert receives an original discussion 860 that raised the unanswered question 340 that was subsequently chosen for the prioritized list 220.

c. Following review by the expert of the explanatory data, the third section of the user interface of the application 810 includes an interface for the assessment 230a (see FIG. 2 and the accompanying text for the introduction of this function), shown here in the compact collapsed form. The third section may include calculating weighted scores, comparisons with other items on the prioritized list 220, optimization, etc.

d. Based on the data review and assessment, the expert 210b decides on a final step of the functionality of the application 810; the fourth section of the user interface may include an incremental instance 240a of the list of selected topics 240 (see FIG. 2 and the accompanying text for definitions and workflow) and an incremental list 870 of dropped items from the priority list 220. Thus, by tapping on one of the screen areas 240a (gesture 830b) or 870 (gesture 830c), the expert 210b may assign the chosen item 840 to the destination list.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets, and other mobile computers. Smartphones and tablets may use operating system(s) selected from the group consisting of: iOS, Android OS, Windows Phone OS, Blackberry OS, and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for generating an agenda for a meeting, comprising:
   creating a content repository that includes content corresponding to at least one of: feedback from previous targeted meetings and information corresponding to ongoing discussions between potential attendees of the meeting;
   automatically creating a prioritized list of discussion topics based on discussions between the potential attendees of the meeting related to the content, wherein the meeting is subdivided into a plurality of smaller meetings having different subsets of the potential attendees of the meeting;
   providing the prioritized list of the discussion topics on a computer screen;
   at least one expert providing gestures to the computer screen to create an assessment for the discussion topics, display on the computer screen additional data for the prioritized list of the discussion topics, and/or transfer one or more of the discussion topics of the prioritized list of the discussion topics to either a list of dropped discussion topics or to an ordered list of selected discussion topics;
   automatically generating an agenda based on the ordered list of selected discussion topics and on weights assigned to the at least one expert according to relative expertise of the at least one expert with respect to each of the discussion topics, wherein an order of agenda items of the agenda is based in part on the weights, wherein the agenda items are characterized according to a quantified assessment of importance of each of the agenda items by the at least one expert and according to expected meeting duration time of each of the agenda items;
   assigning a weight to each of the agenda items that corresponds to a relative importance of each of the agenda items;
   estimating a duration of each of the agenda items;
   estimating a relevance of each of the agenda items to attendees of each of the smaller meetings; and
   assigning a subset of the agenda items to each of the smaller meetings based on the weight, the duration, and the relevance of each of the agenda items.

2. A method, according to claim 1, wherein the meeting is called in response to the ongoing discussions between potential attendees.

3. A method, according to claim 1, wherein the meeting is a targeted meeting having a preliminary agenda that is used in connection with automatically creating the prioritized list of the discussion topics.

4. A method, according to claim 1, wherein the content includes one or more of: notes, documents, diagrams, charts, graphs, tables, reports, and schedules corresponding to the discussions.

5. A method, according to claim 4, wherein at least some of the content is provided by cloud data.

6. A method, according to claim 1, wherein automatically creating a prioritized list of the discussion topics includes automatically processing the discussions using natural language processing, sentiment recognition technology and a content classifier.

7. A method, according to claim 6, wherein automatically creating a prioritized list of the discussion topics uses at least one of: unanswered questions related to a preliminary agenda of a targeted meeting, unresolved conflicts or disputes, identified problems, and/or similarities to topics from similar ones of the previous targeted meetings from the content repository.

8. A method, according to claim 1, wherein similar topics are grouped together.

9. A method, according to claim 1, wherein the at least one expert adds at least one discussion topic to the ordered list of selected discussion topics.

10. A method, according to claim 1, wherein the agenda is modified to reorder and/or remove at least some of the agenda items.

11. A method, according to claim 1, wherein the weights are periodically adjusted based on success or failure of expert recommendations with respect to each of the discussion topics and corresponding ones of the agenda items.

12. A method, according to claim 11, wherein a machine learning algorithm adjusts the weights based on a number of the discussion topics recommended by the at least one expert that are adopted for the agenda by a decision maker and on a number of the discussion topics recommended by the at least one expert that are eliminated from the agenda by the decision maker.

13. A method, according to claim 1, wherein an ordering of the agenda items is based on the quantified assessment of importance and the expected meeting duration time of each of the agenda items.

14. A method, according to claim 13, wherein the ordering of the agenda items maximizes a sum of each of the quantified assessments of importance in a total amount of time allotted to the meeting.

15. A method, according to claim 13, wherein the agenda items are ordered according to the quantified assessment of importance of each of the agenda items in a total amount of time allotted to the meeting.

16. A method, according to claim 1, wherein assigning a subset of the agenda items to each of the smaller meetings maximizes a sum of the weights while satisfying a first restriction that ensures that a meeting time budget is not exceeded and a second restriction that each of the smaller meetings only includes relevant agenda items.

17. A non-transitory computer readable medium containing software that generates an agenda for a meeting, the software comprising:

executable code that creates a content repository that includes content corresponding to at least one of: feedback from previous targeted meetings and information corresponding to ongoing discussions between potential attendees of the meeting;

executable code that automatically creates a prioritized list of discussion topics based on discussions between the potential attendees of the meeting related to the content, wherein the meeting is subdivided into a plurality of smaller meetings having different subsets of the potential attendees of the meeting;

executable code that provides the prioritized list of the discussion topics on a computer screen;

executable code that receives input from at least one expert that provides gestures to the computer screen to create an assessment for the discussion topics, displays on the computer screen additional data for the prioritized list of the discussion topics, and/or transfers one or more of the discussion topics of the prioritized list of the discussion topics to either a list of dropped discussion topics or to an ordered list of selected discussion topics;

executable code that automatically generates an agenda based on the ordered list of selected discussion topics and on weights assigned to the at least one expert according to relative expertise of the at least one expert with respect to each of the discussion topics, wherein an order of agenda items of the agenda is based in part on the weights, wherein an order of agenda items of the agenda is based in part on the weights, wherein the agenda items are characterized according to a quantified assessment of importance of each of the agenda items by the at least one expert and according to expected meeting duration time of each of the agenda items;

executable code that assigns a weight to each of the agenda items that corresponds to a relative importance of each of the agenda items;

executable code that estimates a duration of each of the agenda items;

executable code that estimates a relevance of each of the agenda items to attendees of each of the smaller meetings; and executable code that assigns a subset of the agenda items to each of the smaller meetings based on the weight, the duration, and the relevance of each of the agenda items.

18. A non-transitory computer readable medium, according to claim 17, wherein the meeting is called in response to the ongoing discussions between potential attendees.

19. A non-transitory computer readable medium, according to claim 17, wherein the meeting is a targeted meeting having a preliminary agenda that is used in connection with automatically creating the prioritized list of the discussion topics.

20. A non-transitory computer readable medium, according to claim 17, wherein an ordering of the agenda items is based on the quantified assessment of importance and the expected meeting duration time of each of the agenda items.

* * * * *